Apr. 10, 1923.
G. L. STEVENS
1,451,596
CIRCUIT CLOSER FOR SOFT TIRE ALARMS
Filed Jan. 31, 1919
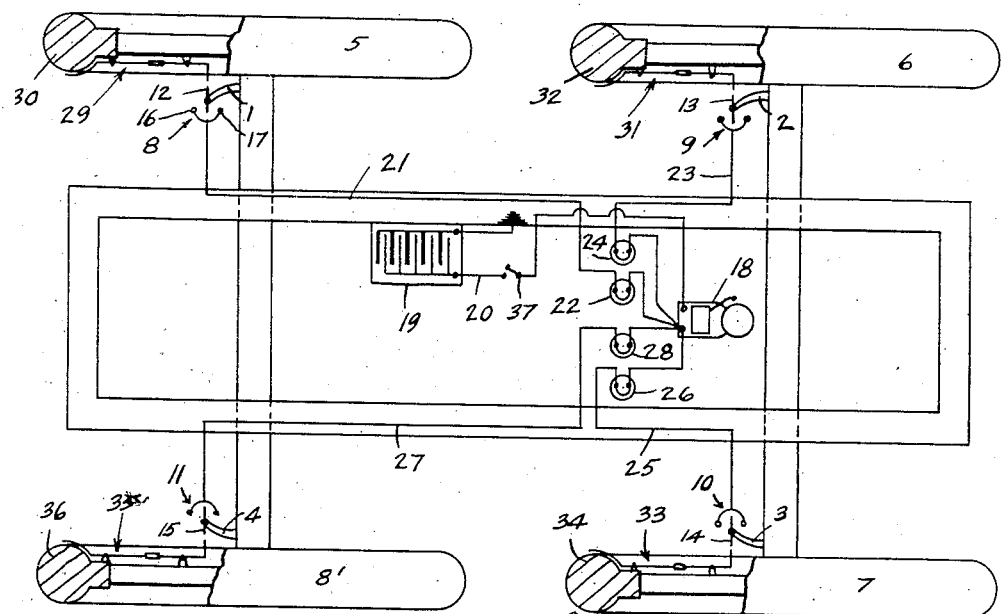
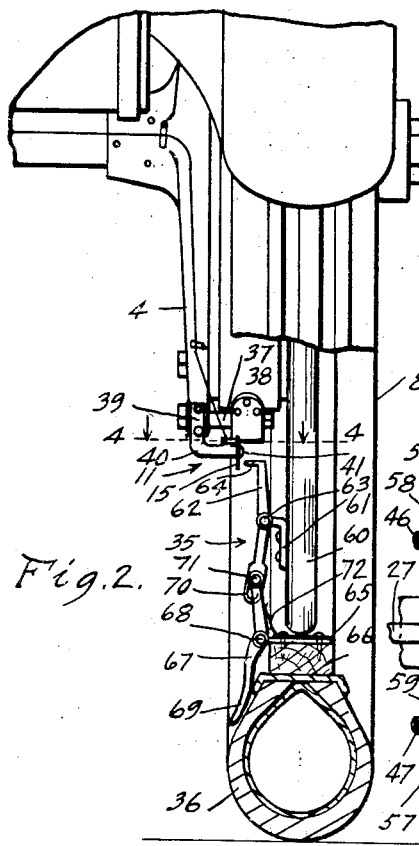
Inventor:
George L. Stevens
By Hazard & Miller
Attys.

Patented Apr. 10, 1923.

1,451,596

UNITED STATES PATENT OFFICE.

GEORGE L. STEVENS, OF LONG BEACH, CALIFORNIA.

CIRCUIT CLOSER FOR SOFT-TIRE ALARMS.

Application filed January 31, 1919. Serial No. 274,249.

*To all whom it may concern:*

Be it known that I, GEORGE L. STEVENS, a subject of the King of Great Britain, residing at Long Beach, in the county of Los Angeles and State of California, have invented new and useful Improvements in Circuit Closers for Soft-Tire Alarms, of which the following is a specification.

My invention relates to soft tire alarms and consists of the novel features herein shown, described and claimed.

My object is to provide a vehicle, such as an automobile, with a soft tire alarm system and mount the alarm and indicator in position upon the vehicle so that it may be easily heard and seen.

Fig. 1 is a diagrammatic view showing a soft tire alarm embodying the principles of my invention applied to the four wheels of a vehicle so that if any one of the four wheels become soft the alarm will ring and the indicator will show which tire is soft.

Fig. 2 is a fragmentary detail showing the soft tire alarm applied to one wheel.

Fig. 3 is a fragmentary outside elevation showing the actuator upon the wheel and the two-way switch upon the frame.

Fig. 4 is an enlarged sectional detail through the switch on the line 4—4 of Figures 2 and 3.

Fig. 5 is an end view of the switch shown in Fig. 4.

Referring to Fig. 1, switch supporting brackets 1, 2, 3 and 4 are secured to the frame of the vehicle and extend downwardly inside of the traction wheels 5, 6, 7 and 8' and two-way switches 8, 9, 10 and 11 are mounted upon the lower ends of the brackets 1, 2, 3 and 4. The switch blades 12, 13, 14 and 15 are grounded upon the frame through the brackets 1, 2, 3 and 4. Each switch has a pair of contacts 16 and 17 insulated from the frame and connected together. An alarm bell 18 is mounted upon the instrument board and connected to the battery 19 by a line 20 and the battery 19 is grounded upon the frame. A line 21 connects the contacts 16 and 17 of the switch 8 through an indicator lamp 22 to the bell 18. A line 23 connects the contacts 16 and 17 of the switch 9 through an indicator lamp 24 to the bell 18. A line 25 connects the contacts 16 and 17 of the switch 10 through an indicator lamp 26 to the bell 18, and a line 27 connects the contact points 16 and 17 of the switch 11 through an indicator lamp 28 to the bell 18.

The actuating mechanism 29 is mounted upon the wheel 5 in position to operate the switch blade 12 when a tire 30 goes flat, and when the actuator 29 is operated to move the switch 12 to engage the contact 16 or 17 the circuit is closed through the line 21 and through the indicator lamp 22 to ring the bell 18, and the lamp 22 will show to the operator from which wheel the alarm is coming, and the bell 18 will continue to ring until the switch blade 12 is manually operated to open the circuit.

In a like manner actuating mechanism 31 is mounted upon the wheel 6 to be operated by a tire 32 and to move the switch blade 13 to close the circuit through the line 23 and indicator lamp 24 to the bell 18. Actuating mechanism 33 is mounted upon the wheel 7 to be operated by a tire 34 to move the switch blade 14 and close the line 25 through the indicator lamp 26 and to ring the bell 18. Actuating mechanism 35 is mounted upon the wheel 8 to be operated by a tire 36 to move the switch blade 15 to close the circuit through the line 27 and indicator lamp 28 and to ring the bell 18.

A cutout switch 37 may be incorporated into the line 20 to cut out the battery and render the indicator lamps and bell inoperative when desired.

It is obvious that either the bell 18 or the indicator lamps 22, 24, 26 and 28 may be omitted if desired, or a single lamp may be used in place of the bell 18 without the other lamps.

In Figs. 2, 3, and 4 I have shown the wheel 8', the bracket 4, the actuating mechanism 35, the switch plate 15 and the pneumatic tire 36. The supporting bracket 4 extends downwardly from the frame substantially half way to the ground. As shown, this supporting bracket 4 serves as the brake anchor bracket. A pin 37 supports a brake band 38. An attaching plate 39 is bolted to the lower end of the bracket 4 and a switch supporting arm 40 extends horizontally outwardly from the lower end of the attaching plate 39. The switch blade 15 fits against the vertical outer face of the arm 40 and is secured pivotally in place by a screw 41 inserted through the center of the switch blade 15 and tapped into the arm 40. Bearings 42 and 43 extend forwardly and backwardly from the arm 40. Insulation sleeves 44 and 45 extend through the bearings 42 and 43 and have flanges engaging the ends of the bearings. Binding posts 46 and 47 are inserted through the insulation sleeves 44 and 45 and have heads 48 and 49 engaging the ends of the insulation sleeves 44 and 45. The contact points 16 and 17 project from the heads 48 and 49. Insulation washers 52 and 53 are placed upon the binding posts 46 and 47 against the opposite ends of the bearings from the flanges. Jam nuts 54 and 55 are placed upon the binding posts against the insulation washers 52 and 53. The conductor 27 has eyes 56 and 57 fitting upon the binding posts against the jam nuts 54 and 55 and binding post nuts 58 and 59 are screwed upon the binding posts against the eyes 56 and 57 so as to connect the contact points 16 and 17 to the conductor 27. The switch blade 15 is located near spokes 60 of the wheel 8'.

A bearing bracket 61 is secured to one of the spokes 60 and a lever 62 is connected to the bearing bracket 61 by a pivot 63. A finger 64 extends inwardly from the upper end of the lever 62 in a plane to pass just outside of the pivot 41 and the switch blade 15 and the pivot 63 is in a plane so that when the lever 62 rocks to throw the finger 64 to the spoke 60 the finger 64 will pass the switch blade 15, and when the lever 62 rocks to throw the finger 64 away from the spoke 60 the finger 64 will engage the lower end of the switch blade 15 and turn the switch blade upon the pivot 41 to contact either with the point 16 or the point 17, depending upon which way the wheel 8' is rotated.

A second bearing bracket 65 is attached to the felly 66 of the wheel 8', and a second lever 67 is pivotally connected at its center to the bracket 65 by a pivot 68. A lower end 69 of the lever 67 bears upon the inner side wall of the pneumatic tire 36. The lower end 70 of the lever 62 is longitudinally slotted and overlaps the upper end of the lever 67 and a pin 71 is fixed in the upper end of the lever 67 and slides in the slot 70.

A leaf spring 72 is attached to the bracket 65 to engage the upper end of the lever 67 to hold the lower end 69 of the lever normally in contact with the pneumatic tire 36 and to hold the finger 64 out of the plane of the switch blade 15.

When any one of the tires 30, 32, 34 or 36 become soft through lack of air pressure in the inner tube the tire will flatten and the side wall of the casing will bulge outwardly and press the lower end 69 of the lever 67 outwardly, thereby throwing the finger 64 outwardly from the spoke 60 and into the plane of the switch blade 12, 13, 14 or 15, and as the finger 64 passes the corresponding switch 8, 9, 10 or 11 in either direction the switch blade will be turned to engage either the contact 16 or the contact 17 thereby closing the circuit through the corresponding conductor 21, 23, 25 or 27 and through the corresponding indicator lamp 22, 24, 26 or 28, and through the bell 18.

The lamp will continue to burn and the bell will continue to ring until the switch blade is manually returned to its normal position to open the circuit, and the burning of the lamp 22, 24, 26 or 28 will indicate to the operator which tire has gone soft.

Various changes may be made without departing from the spirit of my invention as claimed.

I claim:

1. A switch supporting bracket adapted to be secured to the frame of a vehicle and extend downwardly on the inner side and adjacent to a wheel, a switch blade pivotally mounted upon the bracket and grounded to the frame, a pair of contacts insulated from the frame and connected together and in position to be engaged by the switch blade, a bearing bracket adapted to be secured to a spoke of a wheel, a lever connected to the bearing bracket by a pivot, a finger extending inwardly from the upper end of the lever in a plane to pass the end of the switch blade and adapted to swing into engagement with the switch blade, a second bearing bracket adapted to be attached to the felly of the wheel, and a second lever pivoted at its center to the second bracket and having a lower end adapted to bear upon the inner side wall of a pneumatic tire, and having its upper end connected to the lower end of the first lever; so that when the tire goes flat the upper end of the first lever will swing into the plane of the switch blade and move the switch blade against one of the contacts.

2. A circuit closer for soft tire alarms comprising a rocking arm pivotally mounted on the rim of the wheel and positioned to be moved transversely by the tire when soft, a second rocking arm pivoted on the wheel, and having its lower end engaged by the first mentioned arm to rock the latter transversely of the wheel, a projection on the upper end of the second rocking arm, a circuit closing switch supported adjacent the wheel, and a blade on said switch which blade is adapted to coöperate with a pair of outwardly projecting contacts and is positioned to be engaged and thrown by the said projection to close the circuit when the tire is soft.

In testimony whereof I have signed my name to this specification.

G. L. STEVENS.